July 12, 1938.  C. J. SCHLAFMAN  2,123,440
AIR CONDITIONING SYSTEM
Filed April 13, 1936   5 Sheets-Sheet 4

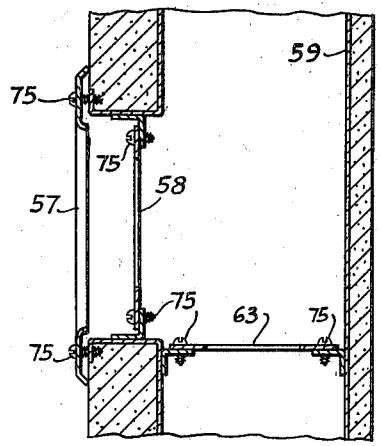
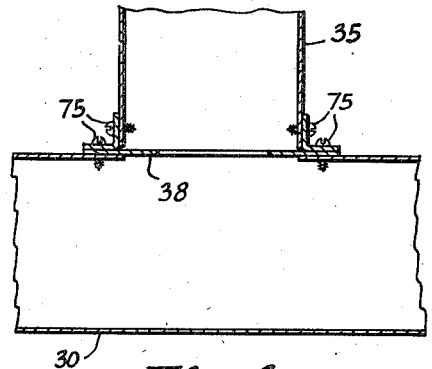
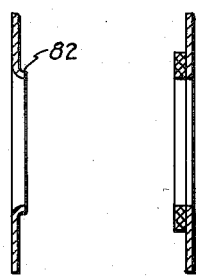
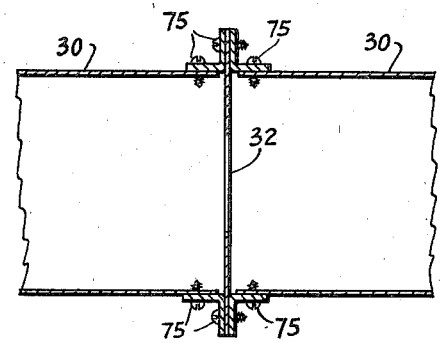
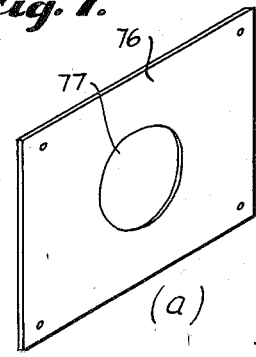
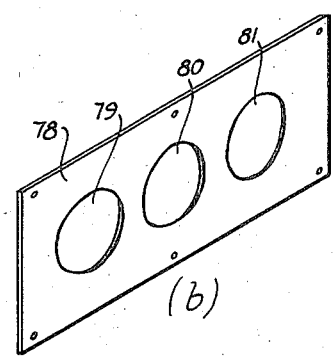

Inventor:
Clifford J. Schlafman

July 12, 1938.　　　C. J. SCHLAFMAN　　　2,123,440
AIR CONDITIONING SYSTEM
Filed April 13, 1936　　　5 Sheets-Sheet 5

Inventor:

Patented July 12, 1938

2,123,440

UNITED STATES PATENT OFFICE 2,123,440

AIR CONDITIONING SYSTEM

Clifford J. Schlafman, Dayton, Ohio

Application April 13, 1936, Serial No. 74,047

9 Claims. (Cl. 98—33)

This invention relates to a method of and a means for regulating the flow of gaseous fluids to and from a space to be conditioned and, also, to a method of controlling the quantity of gaseous fluids supplied to, returned, or exhausted from a space to be conditioned.

The present tendency in the construction of air conditioning systems in dwellings, apartments, hotels and office buildings is to install a system of fluid conveying ducts connecting with grilles arranged in groups with fan capacity based upon the most remote grille therefrom. To prevent excessive fluid flow through grilles other than the most remote, and because of the lower resistance to air flow thereto, dampers are employed to equalize resistances but such systems have been costly to install and difficult to balance and keep in satisfactory operative condition. These difficulties have been experienced in insuring proper movement of the air throughout the system and in obtaining desired results.

All of these difficulties are entirely overcome with my improved system in that dampers, ordinarily installed to equalize resistances and thereby balance air flow, are dispensed with and the air in the system, controlled in quantity and so subdivided that different portions of the conveying system, ducts, risers, grilles, etc., pass amounts only in the exact quantity required, the circulation thus produced insuring the exact pre-determined air conditioning results as to temperature, air movement, number of air changes, etc.

One of the objects of the invention is to provide suitable means for distributing to grilles arranged in groups the proper proportion of air necessary therefore as an entirety and, also, as required by the respective grilles of such groups, whereby the different groups of grilles may operate to maintain uniform air conditioning under different outside temperature conditions to which they may be respectively subjected during the same period of time.

Another object of the invention is to provide improved apparatus for insuring the proper amount of air to be supplied to the grilles by controlling the air supply to the system and proportionately distributing the air to respective groups of grilles and to individual grilles of said groups in exactly the proper relative quantities to insure uniform air conditioning of the building thereby.

Other objects of the invention are to improve generally the simplicity and efficiency of air conditioning systems and to provide apparatus of this kind which are economical to manufacture and operate and which are easy to install.

Still other objects and advantages of the improvement will be apparent from the accompanying description and drawings. In order that the invention may be fully understood, references may be made to the accompanying drawings in which:

Figure 3 is a part sectional elevation of a typical exhaust grille and orifice and exhaust riser and orifice;

Figure 4 is a part sectional elevation of a typical supply riser connection to a main horizontal duct showing orifice plate;

Figure 5 is a part sectional elevation of a typical orifice plate in a horizontal branch duct;

Figure 1:
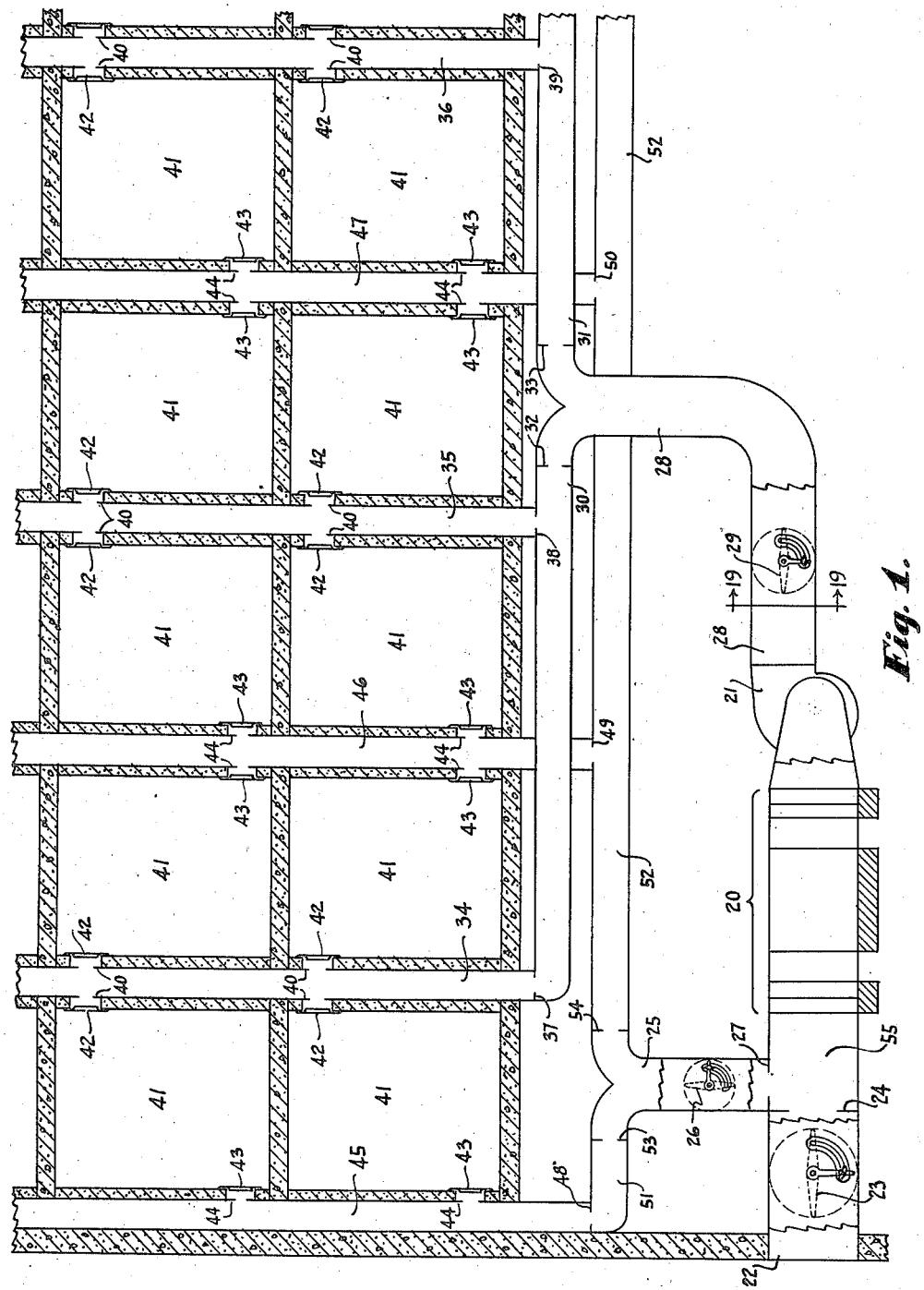
Figure 1 is a diagrammatic side elevation of the supply and return system, portions being shown partly in section.
Figure 8:
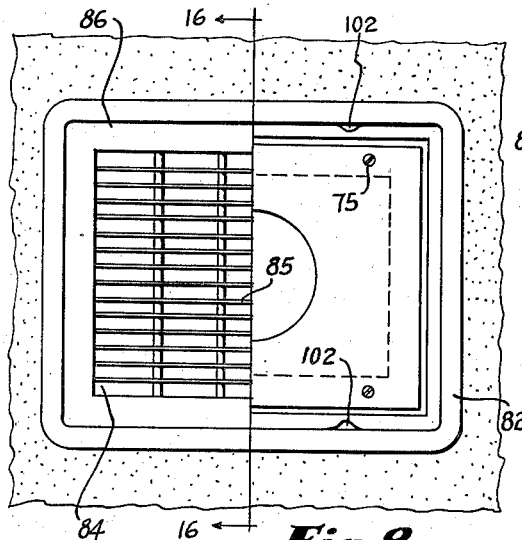
Figure 9:
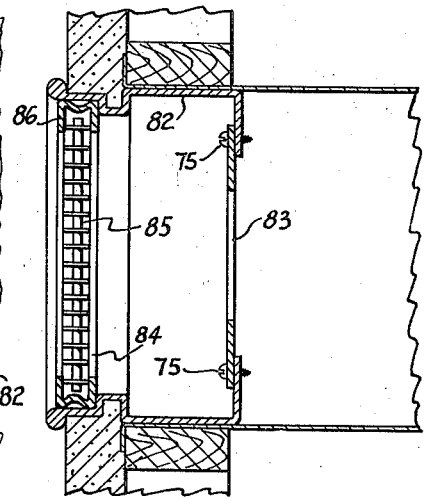
Figure 10:
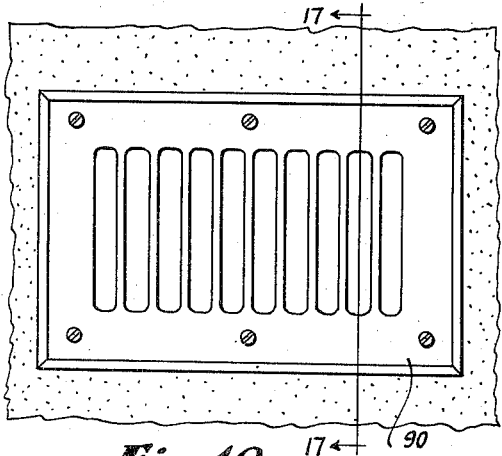
Figure 11:
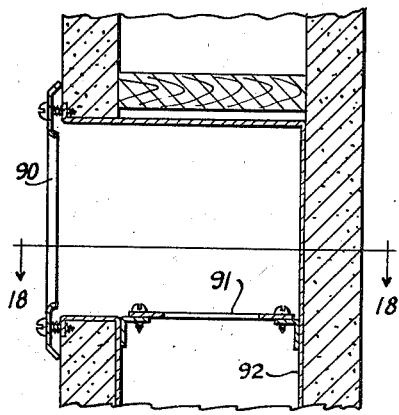
Figure 12:
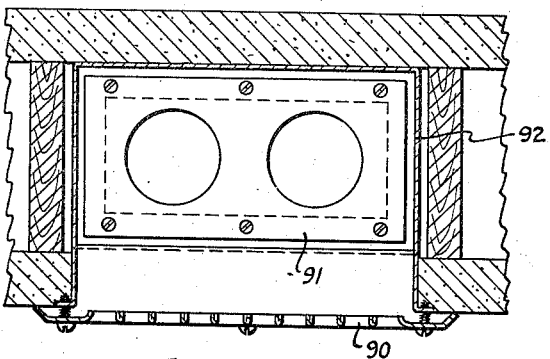
Figure 13:
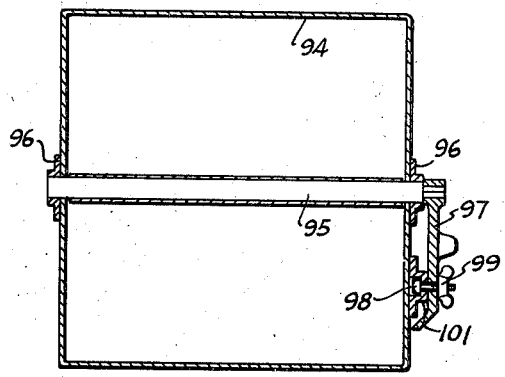
Figure 14:
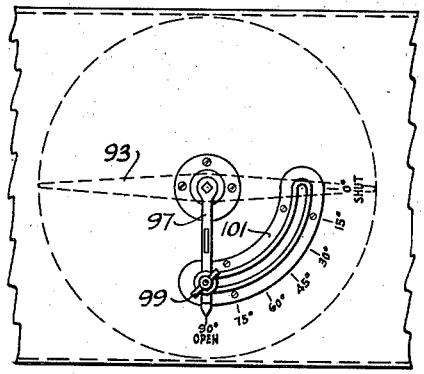
Figure 15:
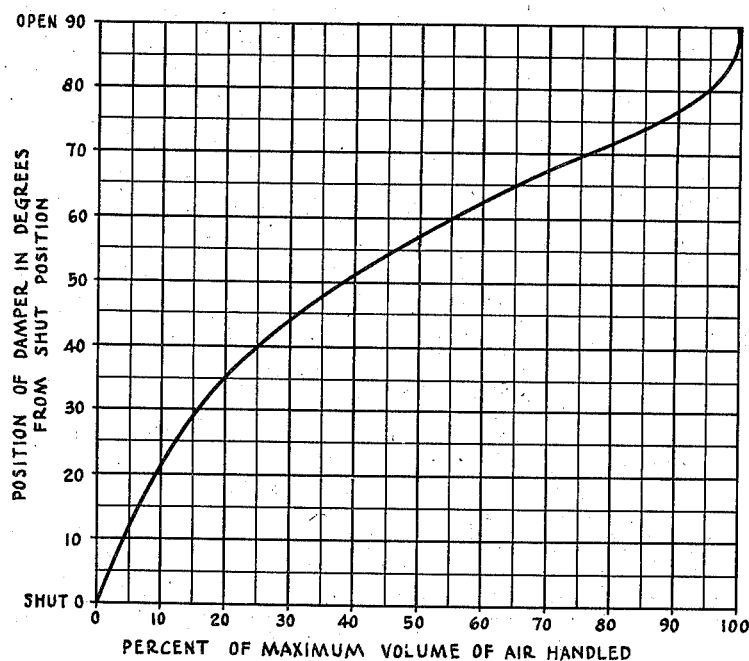

Figures 6 (a) and (b) are isometric views of typical orifice plates;

Figure 7 (a) is a sectional elevation of an orifice plate used to minimize turbulence, and (b) is a sectional elevation of an orifice plate with sound absorbing facing on the upstream side;

Figure 8 is a part front elevation of a typical grille and an orifice plate arranged within a horizontal duct;

Figure 9 is a sectional view taken on line 16—16 of Figure 8;

Figure 10 is an elevation of a typical grille of another type with an orifice plate arranged within a vertical riser;

Figure 11 is a sectional view taken on line 17—17 of Figure 10;

Figure 12 is a sectional view taken on line 18—18 of Figure 11;

Figure 13 is a sectional view taken on line 19—19 of Figure 1;

Figure 14 is an elevation of a volume control damper showing calibration for angular damper settings; and Figure 15 shows a curve used to determine damper setting for a desired air volume.

Considering the drawings, similar designations referring to similar parts, and first referring to Figure 1, numeral 20 designates generally air conditioning apparatus; a fan 21 is adapted to draw a mixture of outside air through an opening 22, controlled by a proportioning damper 23 and orifice 24, and return air through return duct 25, controlled by a proportioning damper 26 and orifice 27. The air is drawn through the conditioning apparatus 20 and delivered through a substantially horizontal main duct 28, controlled by volume damper 29. Branch horizontal ducts 30 and 31 with orifice plates 32 and 33 respectively convey the conditioned air to risers 34, 35 and 36 with orifice plates 37, 38 and 39 respectively placed at the base of said risers. The air from risers 34, 35 and 36 passes through orifice plates 40, 40, 40, etc., and is discharged into conditioned space 41, 41, 41, etc., through grilles 42, 42, 42, etc. Return air is withdrawn from conditioned spaces 41, 41, 41, etc., through grilles 43, 43, 43, etc., and orifice plates 44, 44, 44, etc., down return risers 45, 46 and 47 through orifice plates 48, 49 and 50 respectively placed at the base of said return risers and into substantially horizontal branch return ducts 51 and 52, having orifices 53 and 54 respectively, said branch return ducts merging into a main return air duct 25. The return air commingles with the outside air in chamber 55.

Figure 2:
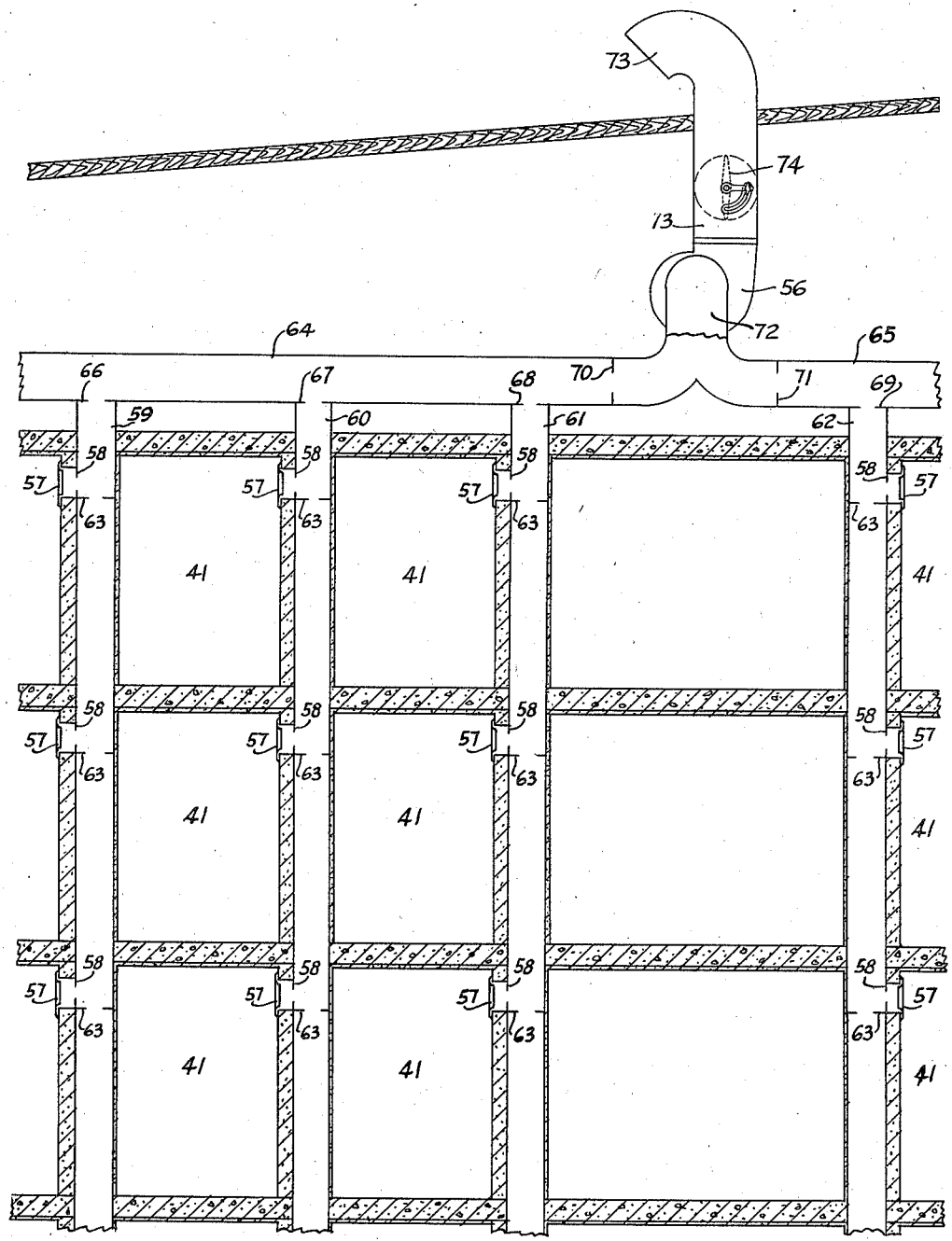
Figure 2 is a diagrammatic side elevation of the exhaust system, portions being shown partly in section.

In Figure 2, fan 56 is adapted to draw air from spaces 41, 41, 41, etc., through grilles 57, 57, 57, etc., and orifices 58, 58, 58, etc., into risers 59, 60, 61 and 62. In each riser and just below orifices 58, 58, 58, etc., are installed riser orifices 63, 63, 63, etc. The air passes into substantially horizontal branch ducts 64 and 65 through orifices 66, 67, 68 and 69 respectively positioned at top of said risers. The air in branch ducts 64 and 65 passes through orifices 70 and 71 and combines in main duct 72 being discharged by fan 56 to the exterior of the building through discharge duct 73, said discharge duct 73 being fitted with volume damper 74.

Figure 3 shows an enlarged sectional part elevation of riser orifice 63 in exhaust riser 59 which is typical of the exhaust system. Obviously, access to riser orifice 63 is obtained by removing grille 57 and orifice 58, said grille and orifices being attached by means of screws 75.

Figure 4 shows an enlarged sectional part elevation of main duct 30, orifice 38 and riser 35 which is typical of the supply system. Access to orifice plate 38 is obtained by removing screws 75.

Figure 5 shows an enlarged part sectional elevation of branch supply duct 30 and orifice 32, which is typical of both supply and exhaust system branch ducts. Access to orifice is obtained by removing screws 75.

Figure 6 (a) shows a substantially square orifice plate 76 with one centrally disposed orifice 77. In Figure 6 (b) is shown a substantially long and narrow orifice plate 78 having orifices 79, 80 and 81, thus showing method of providing proper orifice area in rectangular plates or shapes that do not lend themselves readily to one centrally disposed orifice.

Orifices may be provided with a formed lip 82 turned in the direction of flow for more efficient operation as shown in Figure 7 (a), or, provided with a felt surfacing around opening on the upstream side as in Figure 7 (b) for quiet operation.

In Figures 8 and 9 frame 82 is adapted to receive orifice plate 83 attached by means of screws 75 and grille 84. Grille 84, in practice, is known as a masking type grille and consists of a fin core 85 surrounded by a substantially U-shaped moulding 86 which yields slightly as the grille is snapped into the frame, allowing lugs 102 in the frame to engage a groove in the moulding. In this arrangement, the air moves in a substantially straight line through duct, orifice and grille and orifice 83 is removable from frame 82 with grille 84 removed. This type and arrangement of grille, orifice and frame can be adapted to supply, return and exhaust systems with slight modifications where building construction makes it impractical to carry the air in a substantially straight line.

In Figures 10, 11 and 12 is shown a grille 90 and orifice 91 at the top of a riser 92. In this type and arrangement the grille and orifice are attached by means of screws 75 directly to sheet-metal forming the riser and the air, in a supply system, changes direction after passing through the orifice. The orifice is accessible with grille removed.

In Figures 13 and 14 is shown an enlarged detail which is typical of dampers used to proportion the amount of air returned as at 26 and fresh air drawn in as at 23 and to control the volume of air handled in the supply system as at 29 and in the exhaust system as at 74. The damper is of the conventional type consisting of a plate 93 having overall height and width dimensions closely approximating the inside dimensions of the duct 94, said plate 93 being bolted, riveted, or otherwise secured to a shaft 95, supported on bearings 96, 96, said shaft having a square ended extension for adaptation of a lever 97, said lever 97 being at right angles to plate 93 and having on the opposite end a clamping means consisting of a bolt 98 with wing nut 99, said bolt being fitted into a T-slotted quadrant 101, so arranged that said damper can be fixed in any angular position from shut to open.

In Figure 15 is shown a characteristic curve, determined by experiment, showing the percent of maximum volume of air handled with various positions of the damper. Thus, by providing an angular calibration of the quadrant, as shown in Figure 14, and knowing the fan capacity for the particular conditions involved, a damper setting can be made to permit the passage of a desired volume or quantity of air.

In conditioning a large building, a combination of the supply and return systems shown in Figure 1 and the exhaust system shown in Figure 2 is generally required. In smaller buildings the supply and return systems alone as shown in Figure 1 are satisfactory while in still smaller buildings simply a supply system as shown in Figure 1, with the return system omitted, is sometimes used. Air conditioning requirements depend upon the size and type of building and its use and are usually defined and fixed by State and municipality laws or ordinances. Regardless of the combination or type of systems employed, however, my invention is applicable providing there is more than one opening for the passage of air to or from the space being conditioned. Also, in addition to application in conjunction with air conditioning systems for building structures hereinbefore mentioned, my invention is suitable for use in ships and railroad cars.

In Figure 1, in addition to the usual main horizontal duct 28 of the supply system into which the total initial supply of conditioned air is delivered, branch horizontal ducts 30 and 31 each receive a portion of the total air which in turn is supplied to risers 34, 35 and 36 at different distances from the fan, and a plurality of outlet grilles form separate groups severally receiving conditioned air from the respective risers or branch ducts and arranged at different distances from the connection of the risers or branch ducts with the main horizontal duct. Obviously, the resistance to air flow to each grille, to each group of grilles and to each branch duct varies because of the different distances of each grille, each group of grilles and each branch duct from the fan or central source of air. To compensate for the different distances of grilles, etc., from the fan and to equalize the resistances to air flow, I insert orifices of predetermined sizes respectively arranged in each branch duct and riser adjacent to their inlet ends and proportioned to regulate and supply air from the main horizontal duct into the respective risers or branch ducts in quantity to supply the grouped grilles in communication with the respective risers or branch ducts, and separate orifices arranged between the individual grilles of each group and their respective risers, each having an orifice of predetermined size for regulating and normally admitting, to the grilles of the respective groups, the proper amount of conditioned air for the predetermined load, the orifices pertaining to the grilles of the several groups or several grilles of any group differing in area to compensate for the different distances of the respective grilles of the groups from the fan or central source of air, by reason of which definite and proper distribution of conditioned air is normally insured to the numerous grilles and uniform conditioning made possible.

That portion of the air conditioning system which returns a portion of the air to the air conditioning apparatus from the space being conditioned, known as the return system, is treated similar to the supply system insofar as the proportioning and disposition of orifices is concerned. This is done to insure the return of the proper amount of air from each conditioned space, grilles, risers and branch ducts to the conditioning apparatus for conditioning and reentry into the supply system.

In the exhaust system (Figure 2), while orifices are employed within each grille, at the outlet end of each riser and at the ends of each branch exhaust duct to equalize resistances due to differences in distances of grilles, risers and branch ducts from the fan, additional orifices are also inserted within the risers. The location of exhaust grilles is generally near the ceiling where they draw upon air at the highest temperature prevailing in the conditioned space, due to stratification, etc. Also, exhaust grilles are usually located in kitchens, or bath rooms where higher temperatures prevail because of heat generated from cooking or higher maintained temperatures, so that the air when drawn into the exhaust risers tends to create an updraft or stack effect, because of the difference in density between it and outdoor air, with a resulting high velocity in upward movement. In ordinary exhaust systems and depending upon conditions, such as air temperature, height of riser, etc., this upward movement of high velocity air induces excess air through grilles positioned in the lower portion of each riser with the result that more air enters the system than can be handled by the exhaust fan. Experience has shown that this causes a discharge of air exhausted from the spaces in the lower portion of the building into spaces in the upper portion of the building. In order to control exhaust riser velocities and to prevent the objectionable discharge of exhausted air into the conditioned spaces in the upper portion of the building, I insert riser orifices 63, Figure 2 and Figure 3. In supply system risers, as in Figure 1, it has been generally found unnecessary to resort to riser orifices for the reason that air temperatures are under better control and sufficiently low to prevent a rapid acceleration upward and inducement of air from lower to higher levels. However, it is conceived that temperatures sufficiently high to cause this condition may be necessary in a supply system for processing or special air conditioning applications in which event, supply riser orifices would be necessary. It is well known that the flow of fluids through an orifice follows, in general, the law of freely falling bodies where the velocity of flow is proportional to the square root of the pressure drop. In risers, however, the combined effect of the riser friction, the change in atmospheric pressure, static pressure and temperature of the air must be considered. The necessary calculations for sizing orifices for the entire system regardless of their location, however, may readily be made by anyone familiar with factors affecting and the laws governing the flow of air.

In addition to providing a method and means for balancing air distribution throughout the system, it is also the object of this invention, as indicated heretofore, to control the volume or quantity of air supplied to the air conditioning system.

Since the air conditioning apparatus is selected on the basis of an established maximum load or extreme temperature conditions, it is evident that less extreme temperatures require a throttling or decrease in output of the air conditioning apparatus to prevent over conditioning. In general, there are two methods by which the system described can be operated to produce the desired results. Briefly, control to prevent over conditioning can be accomplished by operating the fans at constant speed and regulating the amount of air by means of volume dampers, or, by varying the speed of the fans to regulate the amount of air.

In Figures 1 and 2, I have shown the arrangement I prefer wherein fans 21 and 56 operate at constant speed and the amount or quantity of air handled is established by means of volume dampers 29 and 74. In Figures 1 and 2, these dampers are shown in wide open position as they would be in the case of full load or maximum output. The wide open position is also illustrated in Figure 14 showing a typical damper. If, due to temperature or other conditions, only one-half of the maximum or full load existed, then dampers 29 and 74 would be set at 57 degrees (see Figure 15) to provide an air movement to establish conditioning commensurate with the fifty percent load condition. By positioning the volume dampers in the main ducts in their respective systems, it is obvious that any resistance to air flow introduced by a change in position of said volume dampers affects the flow of air to all grilles in their respective systems in like manner. Proportion dampers 23 and 26 are set or adjusted only when it is desired to change the ratio of returned and fresh air as established by fixed orifices 27 and 24 respectively.

In the second method, that of varying the fan speed to regulate the amount of air movement throughout each system, dampers 29 and 74 can be omitted and suitable speed regulators employed to control the electric motors (not shown) driving the fans so that necessary air volumes are handled by each fan for the load involved.

Experience has shown that building exposures are important factors to be considered in connection with the distribution of air. For example, identical spaces but with different exposures will require different quantities of air to produce results, assuming uniform air conditioning is desired, because of the difference in space loads due to difference in exposures since conditioning depends upon diffusion of the air within the spaces to be conditioned. Because of architectural motif, or otherwise, it may be necessary to use grilles and ducts of identical size to convey the air to and from said identical spaces. Obviously, this can be done since it is only necessary to size the orifices balancing distribution for the individually required air volume and pressure. The combination of a controlling orifice in a riser and each grille makes it possible to change the amount of air supplied to an entire side of a building, or to a particular section, by changing the size of the riser orifice. Thus adjustment can be made for subsequent changes in load because of occupancy or other conditions.

While I have disclosed herein certain embodiments of the various features of my improved air conditioning system, it will be understood that such other modification thereof may be made as fall within the scope of my invention as set out in the appended claims.

Having thus described my invention, what I claim and desire to secure by United States Letters Patent is:

1. A means for proportionally equalizing resistances in air conditioning systems comprising a frame, an air passage-way means communicating with said frame, a grille means on one end of said frame, an orifice plate on the other end of said frame, said orifice plate having a fixed opening therein proportioned to establish a definite resistance so as to insure the passage of a predetermined quantity of air.

2. A distribution balancing means for air conditioning systems comprising a frame, air passage-way means communicating with said frame, a grille means on one end of said frame, an orifice plate on the other end of said frame, said orifice plate having a fixed opening therein proportioned to absorb a portion of the potential energy of the air passing therethrough.

3. A means for simultaneously and proportionally equalizing resistances to air movement in an air conditioning distribution system having a plurality of registers each comprising a frame, an air passage-way means communicating with said frame, a grille means on one end of said frame, an orifice plate on the other end of said frame, said orifice plate being provided with an opening of fixed area proportioned to add resistance to the air passing therethrough.

4. In an air conditioning system having diverging air passage-way means of dissimilar size communicating with a plurality of inclosures to be conditioned, means for proportionally equalizing air distribution through said diverging air passage-way means comprising a substantially thin orifice plate positioned transversely of each of said diverging air passage-way means substantially near the point of divergence, said orifice plates having openings therein of fixed area proportioned to add resistance to the air passing therethrough, and means at their outer edges for holding said orifice plates in position.

5. In an air conditioning system having diverging branch air passage-way means of dissimilar size communicating with a plurality of inclosures to be conditioned, means for proportionally equalizing air distribution through said diverging branch air passage-way means comprising a substantially thin orifice plate positioned transversely of one of said diverging branch air passage-way means substantially near the point of divergence, said orifice plate having an opening of fixed area proportioned to add resistance to the air passing therethrough, and means at the outer edges for holding said orifice plate in position.

6. In an air exhaust system having converging air passage-way means of dissimilar size communicating with a plurality of inclosures, means for proportionally equalizing the resistances to air exhausted through said converging air passage-way means comprising a substantially thin orifice plate positioned transversely of each of said air passage-way means substantially near the point of convergence, said orifice plates having openings of fixed area proportioned to add resistance to the air passing therethrough, and means at their outer edges for holding said orifice plates in position.

7. A register for air conditioning systems comprising a frame, air passage-way means communicating with said frame, a grille means on one end of said frame, an orifice plate on the other end of said frame, said orifice plate being provided with an opening of fixed area arranged to add resistance to the air directed therethrough.

8. In an air conditioning system register, an air inlet, a frame surrounding said inlet, air passage-way means communicating with said frame, a grille means on one end of said frame, an orifice plate on the other end of said frame, said orifice plate having a fixed opening therein proportioned to absorb a portion of the potential energy of the air passing therethrough.

9. In an air conditioning system register, the combination of a frame, a grille and an orifice plate, said frame having four sides of substantially L-shaped cross section, a beaded edge on one end of said frame, means in said frame for securing said grille positioned inwardly of said beaded edge, means in said frame for fixing the position of said grille with respect to said beaded edge, means on the other end of said frame for securing said orifice plate, said grille comprising a fin core surrounded by a substantially U-shaped moulding, said moulding being provided with a groove in its outer surface adapted to engage said means in said frame for securing said grille, said orifice plate being provided with an opening of fixed area proportioned to add resistance to the air passing therethrough.

CLIFFORD J. SCHLAFMAN.